United States Patent
Hatada

(10) Patent No.: US 9,684,155 B2
(45) Date of Patent: Jun. 20, 2017

(54) OPTICAL SYSTEM AND IMAGE PICKUP APPARATUS INCLUDING THE SAME

(71) Applicant: CANON KABUSHIKI KAISHA, Tokyo (JP)

(72) Inventor: Takahiro Hatada, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 140 days.

(21) Appl. No.: 14/513,363

(22) Filed: Oct. 14, 2014

(65) Prior Publication Data
US 2015/0146085 A1   May 28, 2015

(30) Foreign Application Priority Data
Nov. 22, 2013 (JP) ................. 2013-241734

(51) Int. Cl.
| | |
|---|---|
| *G02B 15/14* | (2006.01) |
| *G02B 15/16* | (2006.01) |
| *G02B 15/177* | (2006.01) |
| *G02B 13/06* | (2006.01) |

(52) U.S. Cl.
CPC .......... *G02B 15/161* (2013.01); *G02B 13/06* (2013.01); *G02B 15/177* (2013.01)

(58) Field of Classification Search
CPC .. G02B 15/177; G02B 15/161; G02B 13/003; G02B 9/10; G02B 9/08; G02B 7/021
USPC ................................. 359/642–830
See application file for complete search history.

(56) References Cited

U.S. PATENT DOCUMENTS

| | | | | |
|---|---|---|---|---|
| 5,477,389 A | * | 12/1995 | Ito .................... | G02B 13/04 359/708 |
| 2002/0176177 A1 | * | 11/2002 | Takatsuki ............ | G02B 15/177 359/691 |
| 2008/0106797 A1 | * | 5/2008 | Minefuji ............. | G02B 15/177 359/686 |
| 2011/0310496 A1 | * | 12/2011 | Kubota ............... | G02B 9/64 359/794 |
| 2014/0002908 A1 | * | 1/2014 | Sugita ................. | G02B 15/177 359/682 |
| 2014/0125858 A1 | * | 5/2014 | Sugita ................. | G02B 15/177 348/345 |
| 2014/0340767 A1 | * | 11/2014 | Mori ................... | G02B 13/004 359/715 |

FOREIGN PATENT DOCUMENTS

| | | |
|---|---|---|
| JP | 2007-094174 A | 4/2007 |
| JP | 2011-227124 A | 11/2011 |

* cited by examiner

*Primary Examiner* — Mahidere Sahle
(74) *Attorney, Agent, or Firm* — Carter, DeLuca, Farrell & Schmidt, LLP

(57) ABSTRACT

In an optical system including, in order from an object side to an image side: a front unit (LF) having a negative refractive power; an aperture stop; and a rear unit (LR) having a positive refractive power, the front unit (LF) includes a meniscus-shaped negative lens (g1) closest to the object side, and a focal length (fw) of the entire optical system, a focal length (fg1) of the meniscus-shaped negative lens (g1), and a curvature radius (R2) of a lens surface on the image side of the meniscus-shaped negative lens (g1) are appropriately set.

12 Claims, 6 Drawing Sheets

OPTICAL SYSTEM AND IMAGE PICKUP APPARATUS INCLUDING THE SAME

BACKGROUND OF THE INVENTION

Field of the Invention

The present invention relates to an optical system suitable for being used as an image pickup optical system for an image pickup apparatus such as a digital still camera, a video camera, a TV camera, and a monitoring camera.

Description of the Related Art

In recent years, an image pickup optical system which has a wide field angle and high performance (high resolution) over an entire screen has been required for an image pickup apparatus using a solid-state image pickup element. A retrofocus type image pickup optical system is known as the image pickup optical system having the wide field angle. Japanese Patent Application Laid-Open No. 2011-227124 discloses a retrofocus type wide angle lens with a single focal length, which includes a first lens unit having a negative refractive power, an aperture stop, and a second lens unit having a positive refractive power, and which has a photographing field angle of 120°.

In addition, a negative lead type zoom lens in which a lens unit having a negative refractive power leads other lens units (located closest to an object side) is known as the image pickup optical system with the wide field angle. Japanese Patent Application Laid-Open No. 2007-94174 discloses a zoom lens including a first lens unit having a negative refractive power, and a second lens unit having a positive refractive power. The zoom lens disclosed in Japanese Patent Application Laid-Open No. 2007-94174 is a zoom lens with a wide field angle in which an entire photographing field angle at a wide angle end is 114.7°, and a zoom ratio is about 1.65.

In recent years, the wide field angle and the high resolution have been strongly requested for the image pickup optical system which is to be used in the image pickup apparatus. For realizing the wide field angle and the high resolution in the negative lead type image pickup optical system described above, for example, it becomes important to appropriately set the refractive power and the lens structure of the first lens unit having the negative refractive power.

In general, in the negative lead type image pickup optical system, because the lens units constructing the negative lead type image pickup optical system are asymmetrically arranged, various aberrations such as field curvature and distortion are abundantly generated, and hence these aberrations become difficult to correct. In particular, for the image pickup optical system having the wide field angle region, the refractive power of the first lens unit having the negative refractive power on the object side needs to be strengthened, and hence the aberrations described above are abundantly generated. For this reason, for satisfactorily correcting the distortion aberration and the field curvature while the wide field angle is realized in the negative lead type image pickup optical system, to thereby obtain the high optical characteristic, it becomes important to appropriately set the lens structure of the first lens unit having the negative refractive power.

On the other hand, in the image pickup optical system with the wide field angle, the shapes of the first lens arranged closest to the object side, the second lens arranged adjacent to the image side of the first lens, and the like are set as meniscus shapes, and curvature radii of the lens surfaces of these lenses are reduced, to thereby realize the wide field angle. In particular, in the image pickup optical system with the wide field angle in which the photographing field angle is about 100°, the curvature radii of the lens surfaces of the first lens and the second lens become small in many cases because the negative refractive powers of the first lens and the second lens are strengthened.

In this case, of the light fluxes from the object, the light flux reflected by the lens surface on the object side of the second lens is reflected by the lens surface on the object side of the first lens or the lens surface on the image side of the first lens to reach an image plane in some cases. Such a light flux causes a ghost and flare, which leads to reduction of the image quality of the photographed image. For this reason, in the image pickup optical system with the wide field angle, it is important to appropriately set the shape of the meniscus-shaped negative lens located closest to the object side.

SUMMARY OF THE INVENTION

According to one embodiment of the present invention, there is provided an optical system, including, in order from an object side to an image side: a front unit (LF) having a negative refractive power; an aperture stop; and a rear unit (LR) having a positive refractive power, in which the front unit includes a meniscus-shaped negative lens (g1) closest to the object side, and in which the following conditional expressions are satisfied:

$$3.0 < |fg1/fw| < 6.1$$

$$1.9 < R2/fw < 3.0$$

where fw denotes a focal length of the entire optical system, fg1 denotes a focal length of the meniscus-shaped negative lens (g1), and R2 denotes a curvature radius of a lens surface on the image side of the meniscus-shaped negative lens (g1).

Further features of the present invention will become apparent from the following description of exemplary embodiments with reference to the attached drawings.

DESCRIPTION OF THE EMBODIMENTS

Now, an optical system and an image pickup apparatus including the same according to exemplary embodiments of the present invention are described. The optical system of the present invention is a retrofocus type wide-field angle photographing lens with a single focal length, or a wide-field angle zoom lens which is to be used in an image pickup apparatus. Note that, when the optical system is the zoom lens, the entire system becomes the retrofocus type one at a wide angle end.

The optical system of the present invention includes, in order from an object side to an image side, a front unit LF having a negative refractive power, an aperture stop, and a rear unit LR having a positive refractive power. In the description of the optical system of the present invention, a focal length of the entire system means a focal length of the entire system in a phase of focusing made on an infinity object in the case of an image pickup optical system with a single focal length. In addition, the focal length of the entire system means a focal length at a wide angle end in the phase of the focusing made on the infinity object in the case of a zoom lens.

Figure 1:
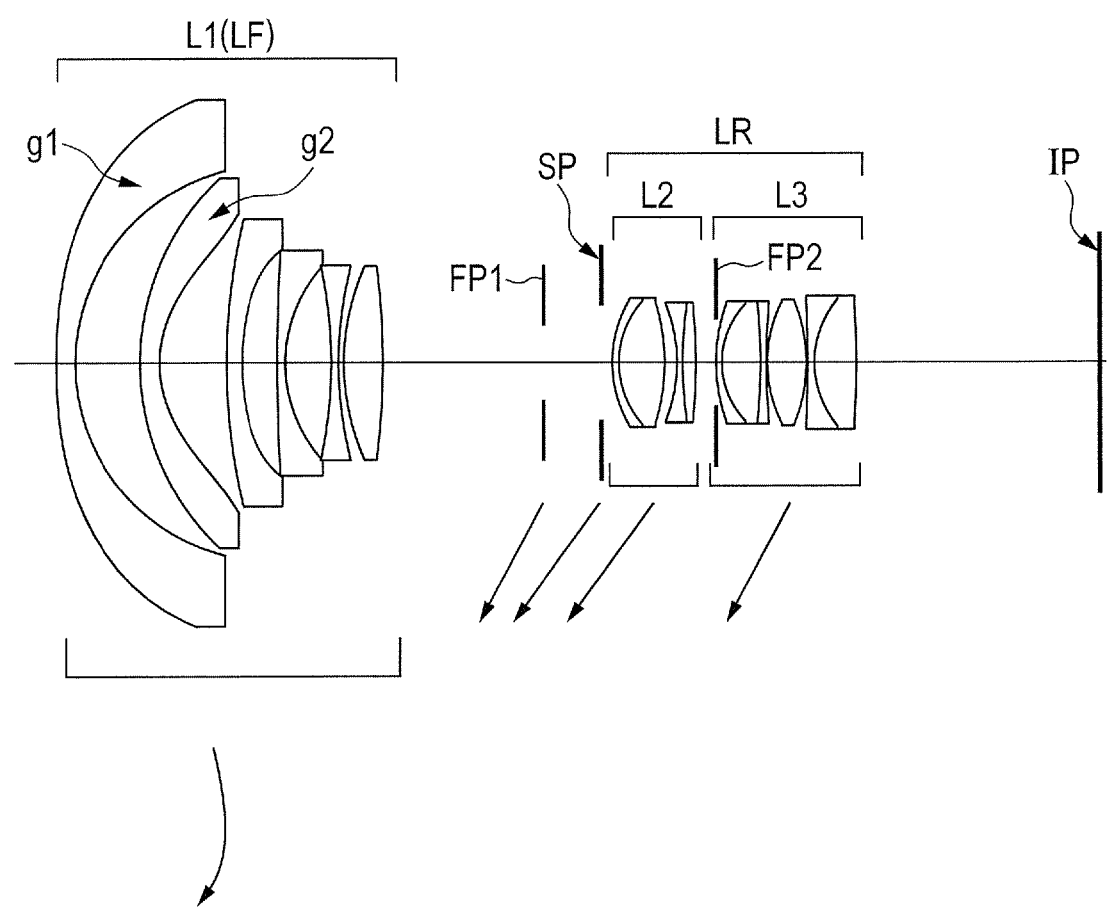
FIG. 1 is a lens cross-sectional view when focusing is made on an infinity object at a wide angle end of a zoom lens according to Example 1 of the present invention.
Figure 2A:
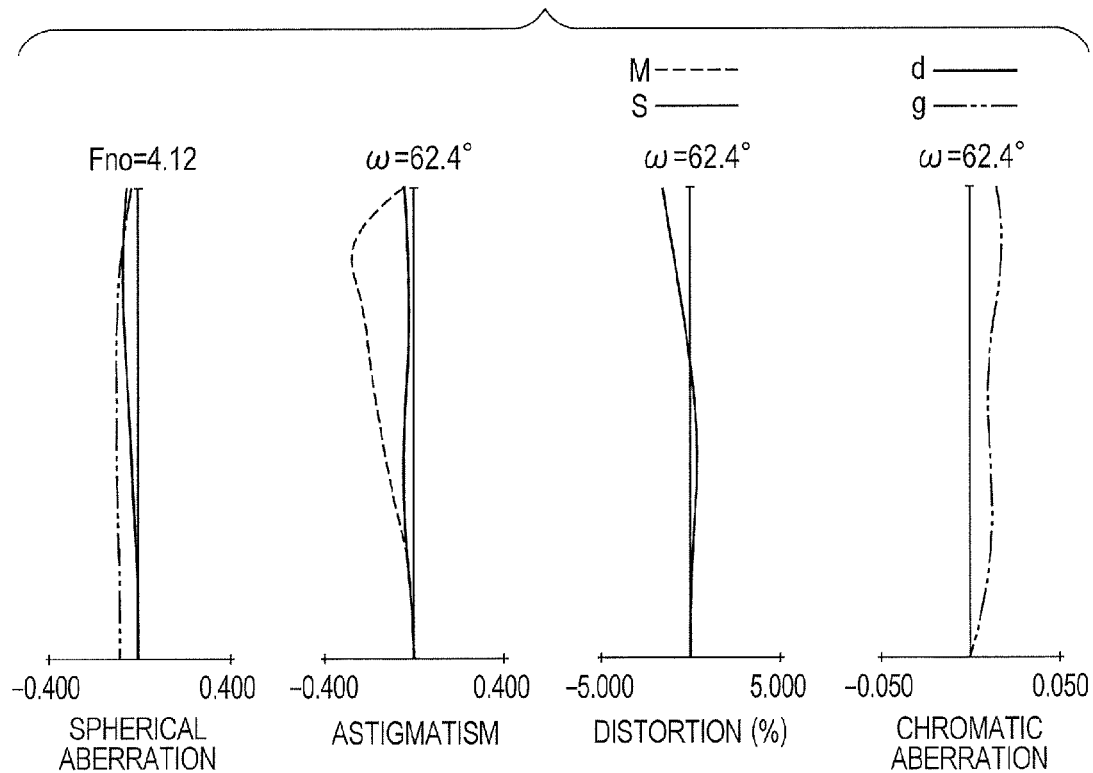
FIG. 2A is a longitudinal aberration diagram when the focusing is made on the infinity object at the wide angle end of the zoom lens of Example 1.
Figure 2B:
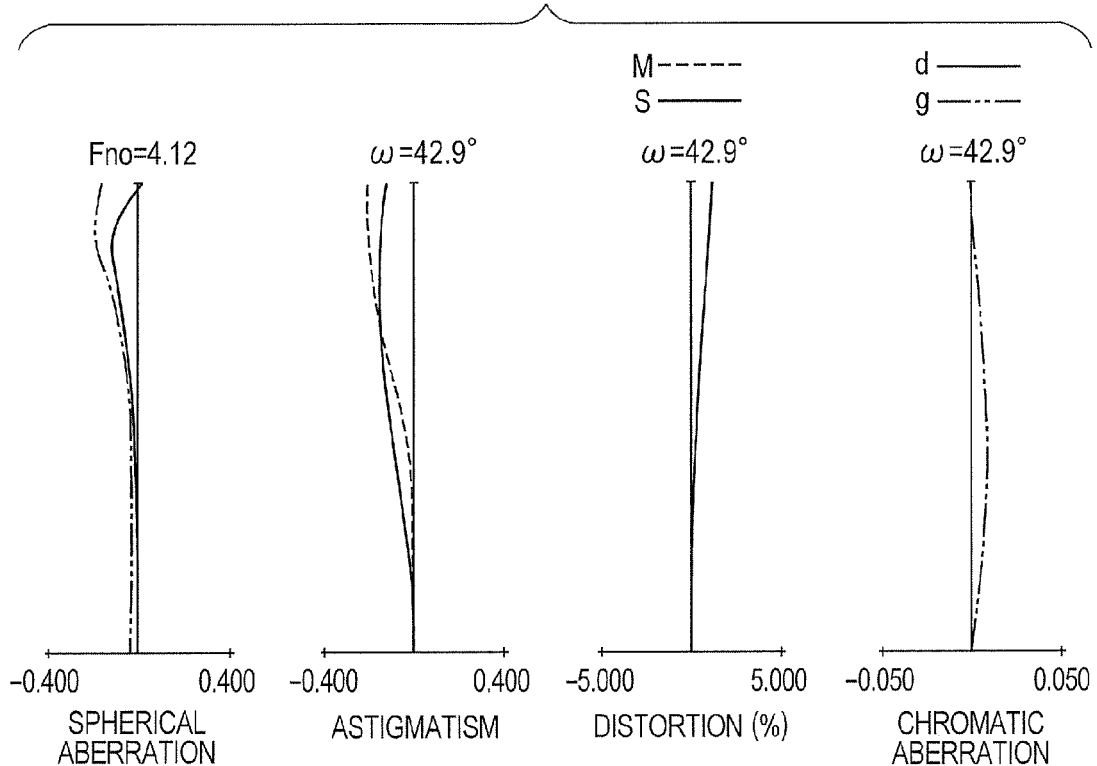
FIG. 2B is a longitudinal aberration diagram when the focusing is made on the infinity object at a telephoto end of the zoom lens of Example 1.
Figure 3:
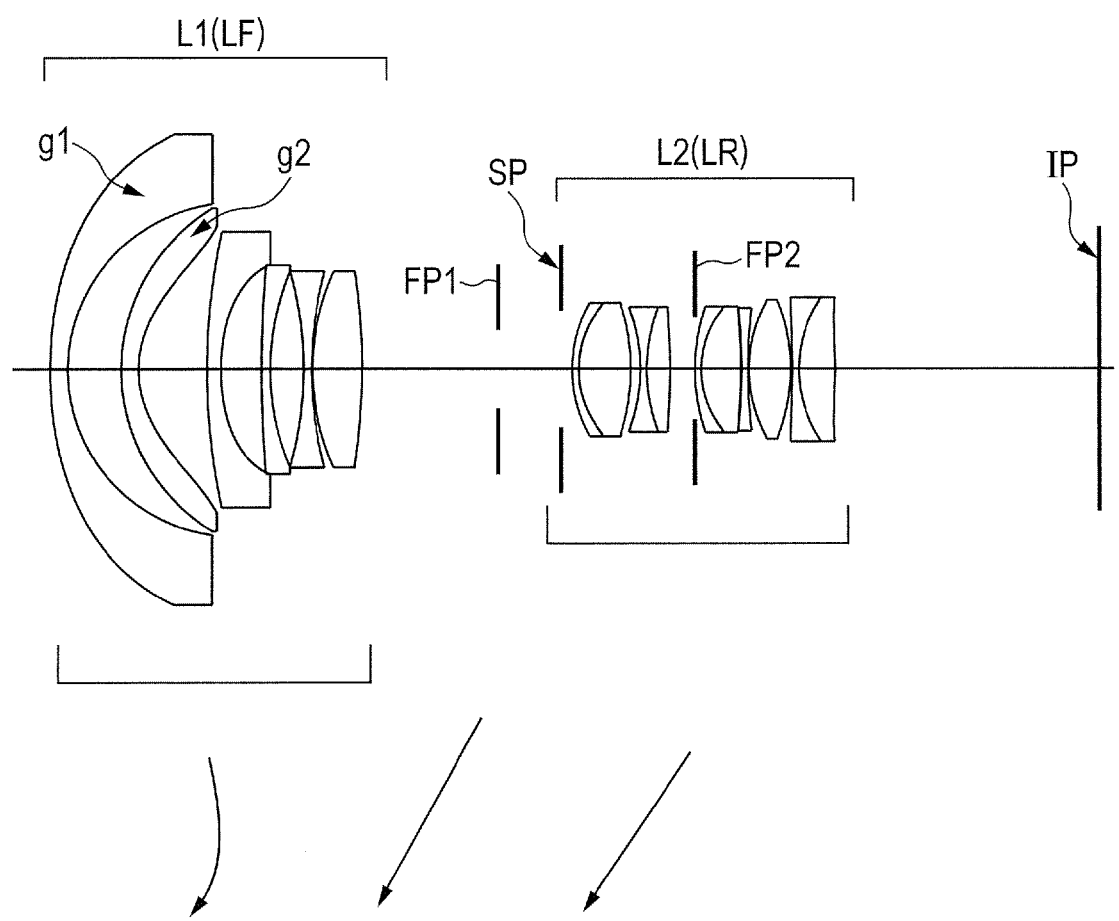
FIG. 3 is a lens cross-sectional view when focusing is made on an infinity object at a wide angle end of a zoom lens according to Example 2 of the present invention.
Figure 4A:
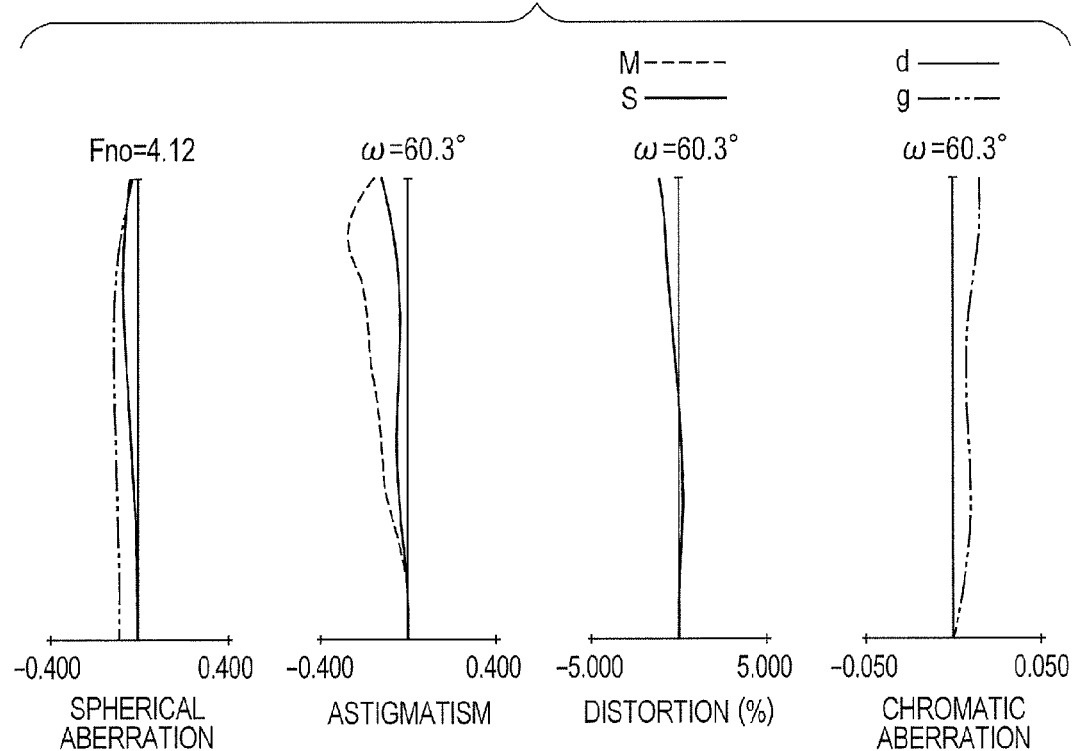
FIG. 4A is a longitudinal aberration diagram when the focusing is made on the infinity object at the wide angle end of the zoom lens of Example 2.
Figure 4B:
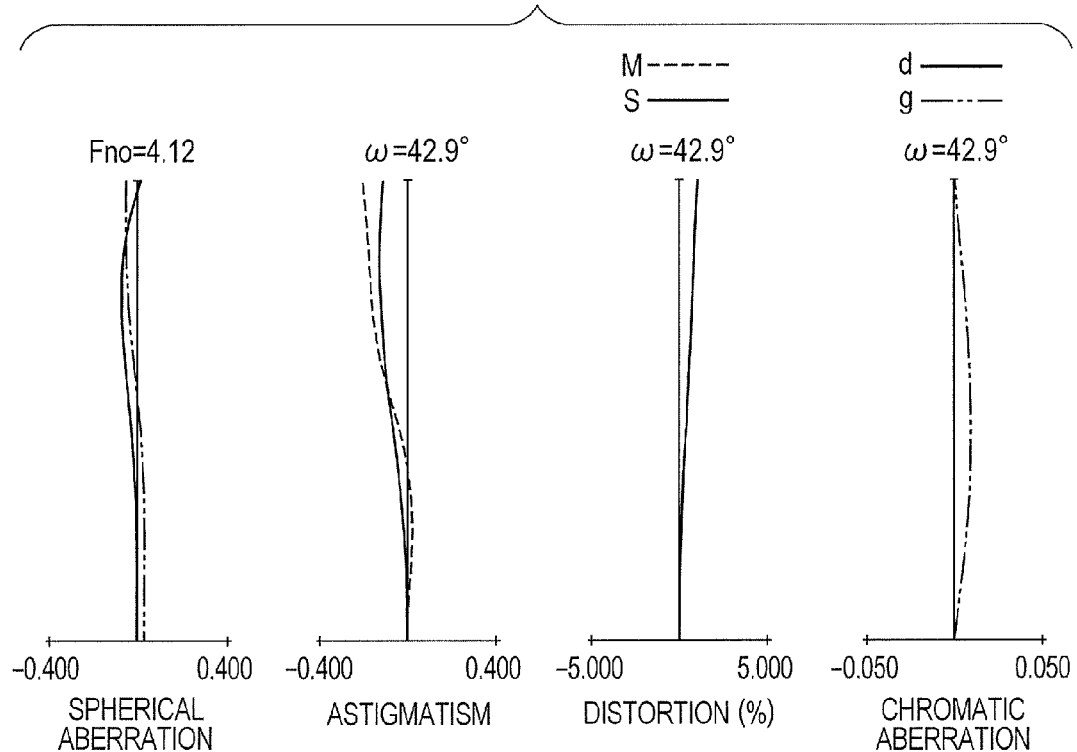
FIG. 4B is a longitudinal aberration diagram when the focusing is made on the infinity object at a telephoto end of the zoom lens of Example 2.

FIG. 1 is a lens cross-sectional view when focusing is made on an infinity object at a wide angle end (at a short focal length end) of Example 1 when the optical system of the present invention is the zoom lens. FIG. 2A is a longitudinal aberration diagram when the focusing is made on the infinity object at the wide angle end of the zoom lens of Example 1. FIG. 2B is a longitudinal aberration diagram when the focusing is made on the infinity object at a telephoto end (at a long focal length end) of the zoom lens of Example 1. FIG. 3 is a lens cross-sectional view when focusing is made on an infinity object at a wide angle end of Example 2 when the optical system of the present invention is the zoom lens. FIG. 4A is a longitudinal aberration diagram when the focusing is made on the infinity object at the wide angle end of the zoom lens of Example 2. FIG. 4B is a longitudinal aberration diagram when the focusing is made on the infinity object at a telephoto end of the zoom lens of Example 2.

Figure 5:
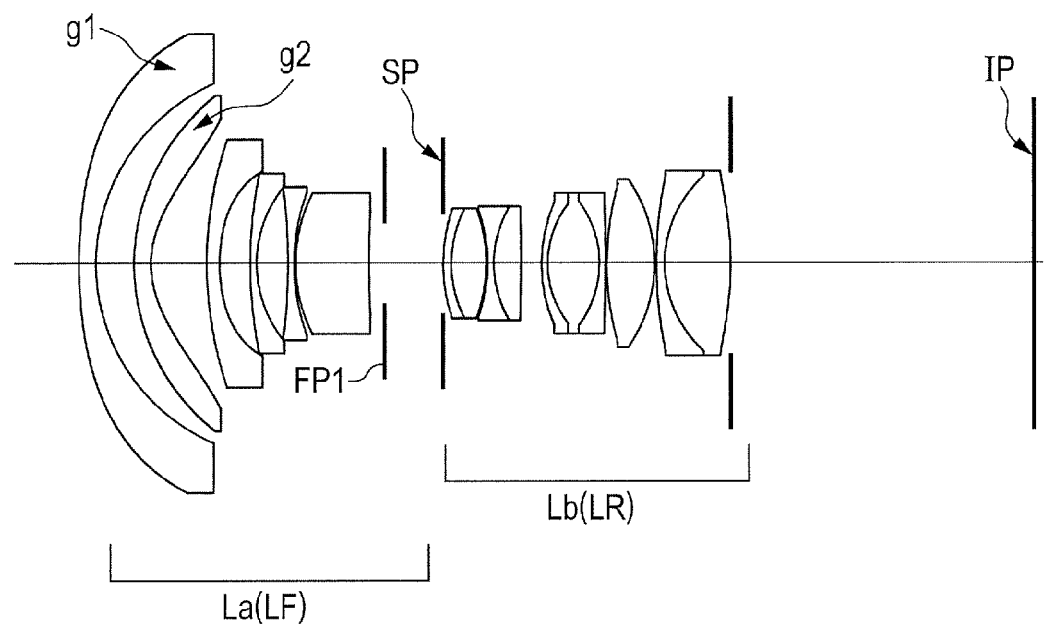
FIG. 5 is a lens cross-sectional view of a zoom lens according to Example 3 of the present invention.
Figure 6:
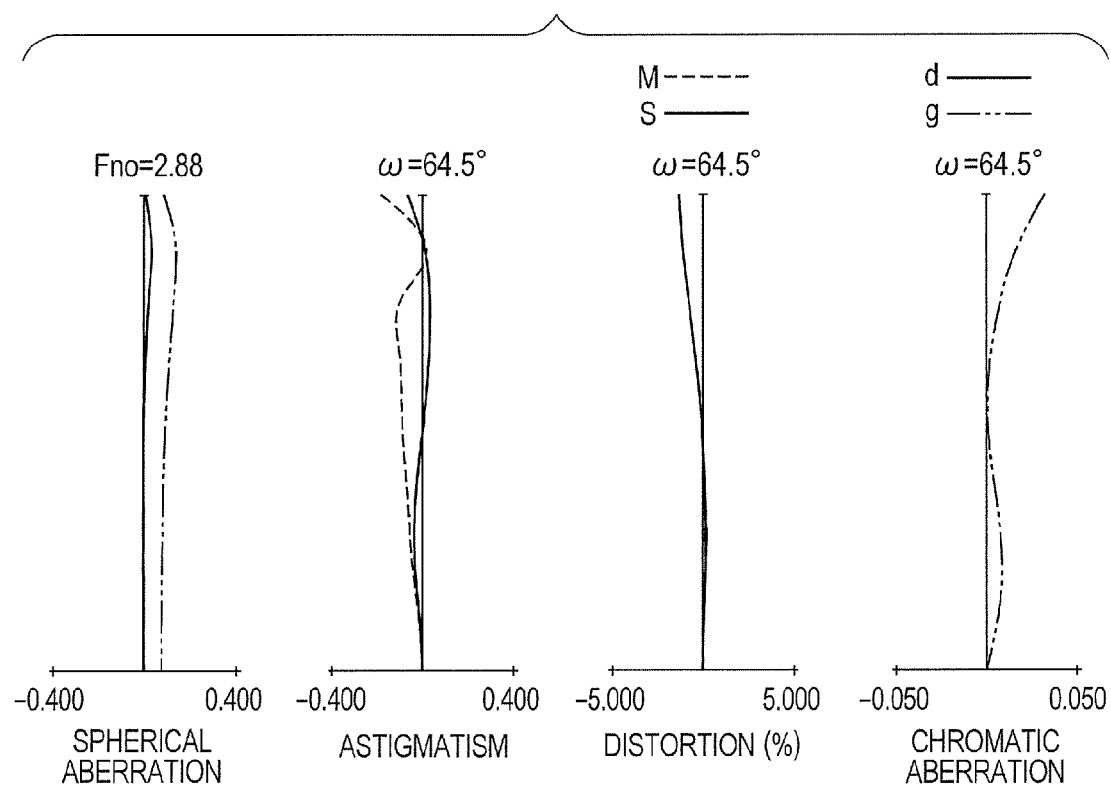
FIG. 6 is an aberration diagram when focusing is made on an infinity object of the zoom lens according to Example 3 of the present invention.
Figure 7:
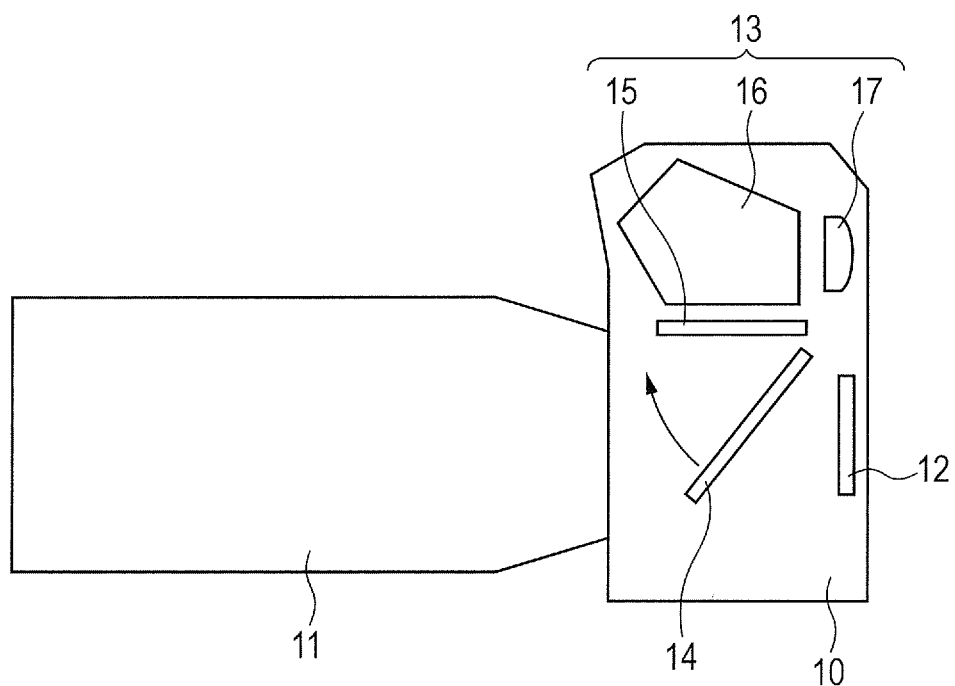
FIG. 7 is a schematic view of a main part of an image pickup apparatus of the present invention.

FIG. 5 is a lens cross-sectional view of Example 3 when the optical system of the present invention is an image pickup optical system with a single focal length. FIG. 6 is an aberration diagram when the focusing is made on the infinity object of the zoom lens according to Example 3 of the present invention. FIG. 7 is a schematic view of a main part of a camera (image pickup apparatus) including the optical system of the present invention. The optical system of each of Examples 1 to 3 is an image pickup optical system which is to be used in an image pickup apparatus such as a video camera, a digital camera, and a silver-halide film camera.

In the lens cross-sectional view, the left side is the object side (front side), and the right side is the image side (rear side). In the lens cross-sectional view, a front unit LF has a negative refractive power (optical power=reciprocal number of a focal length). A rear unit LR has a positive refractive power. A photographing light flux diameter determining member with a variable aperture diameter (hereinafter referred to as an "aperture stop") SP controls a photographing light flux diameter corresponding to an aperture value at the photographing. The aperture stop SP is arranged between the front unit LF and the rear unit LR. Further, flare-cut stops FP1 and FP2 are arranged. In addition, symbol i denotes the order of the lens units from the object side, and symbol Li denotes an i-th lens unit.

In the lens cross-sectional views of FIG. 1 and FIG. 3, arrows indicate loci of movements of the lens units during zooming from the wide angle end to the telephoto end. In Example 1 and Example 2, the wide angle end and the telephoto end respectively mean the zoom positions when each of the lens units is located at both ends in a range in which each of the lens units is movable on the optical axis in terms of the mechanism. On an image plane IP, an imaging plane of a solid-state image pickup element (photoelectric conversion element) such as a CCD sensor or a CMOS sensor is put when the optical system of the present invention is used as a photographing optical system of a video camera or a digital still camera, and a photosurface corresponding to a film surface is put when the optical system of the present invention is used for a silver-halide film camera.

In the zoom lens of Example 1 of FIG. 1, the front unit LF includes a first lens unit L1 having a negative refractive power. The rear unit LR includes a second lens unit L2 having a positive refractive power, and a third lens unit L3 having a positive refractive power. During the zooming, a distance between adjacent lens units changes. Specifically, during the zooming from the wide angle end to the telephoto end, as indicated by the arrows, the first lens unit Li moves to the image side so as to draw a convex-shaped locus. The second lens unit L2 moves to the object side while the distance between the first lens unit L1 and the second lens unit L2 is reduced. The third lens unit L3 moves to the object side while the distance between the second lens unit L2 and the third lens unit L3 is increased.

The aperture stop SP moves integrally with the third lens unit L3. The focusing is carried out by using the second lens unit L2.

In the zoom lens of Example 2 of FIG. 3, the front unit LF includes a first lens unit L1 having a negative refractive power. The rear unit LR includes a second lens unit L2 having a positive refractive power. During the zooming, the first lens unit L1 and the second lens unit L2 move so as to draw the loci different from each other. Specifically, during the zooming from the wide angle end to the telephoto end, as indicated by the arrows, the first lens unit L1 moves to the image side so as to draw a convex-shaped locus. The second lens unit L2 moves to the object side while the distance between the first lens unit L1 and the second lens unit L2 is reduced. The aperture stop SP moves integrally with the second lens unit L2. The focusing is carried out by using a part of the second lens unit L2.

Note that, in each of Example 1 and Example 2, the focusing may be carried out by moving the entire zoom lens or arbitrary one of the lens units.

In an image pickup optical system with a single focal length of Example 3 of FIG. 5, the front unit LF includes a front lens section La having a negative refractive power. The rear unit LR includes a rear lens section Lb having a positive refractive power.

The focusing is carried out by moving a part or whole of the rear unit LR (rear lens section Lb). The aberration diagrams each show a spherical aberration, an astigmatism, a distortion, and a chromatic aberration of magnification in order from the left. In the diagram showing the spherical aberration and the chromatic aberration of magnification, a solid line indicates a d-line (587.6 nm), and a two-dot chain line indicates a g-line (435.8 nm). In addition, in the diagram showing the astigmatism, a solid line indicates a sagittal direction of the d-line, and a broken line indicates a meridional direction of the d-line. The diagram showing the distortion indicates a distortion in the d-line. In addition, symbol Fno denotes an F number, and symbol a denotes a half field angle (degree).

Next, the features other than the above-mentioned features of Example 1 to Example 3 are described. When a lens with an ultra-wide field angle is designed, it is important that the satisfactory optical characteristic is obtained in the entire screen while an effective diameter of a front lens element is prevented from being increased too much.

In general, in order to reduce the effective diameter of the front lens element, it is preferred to make an entrance pupil approach the object side. In this case, it is general to adopt the refractive power arrangement in which the negative refractive power of the front lens group located on the object side, including the lens closest to the object side of the entire optical system, is strengthened. However, when the negative refractive power of the front lens group is excessively strengthened, the curvature radii of the lens surfaces of the lenses are reduced, and hence the ghost and the flare are easily generated by the light fluxes reflected by the lens surfaces. Then, in each of the optical systems of Examples 1 to 3, the optical system including, in order from the object side to the image side, the front unit LF having the negative refractive power, the aperture stop SP, and the rear unit LR having the positive refractive power adopts the structure as follows.

The front unit LF includes a meniscus-shaped negative lens g1 closest to the object side. In addition, a focal length (a focal length at a wide angle end when the optical system is the zoom lens) of the entire system is denoted by fw, and a focal length of the negative lens g1 is denoted by fg1. In this case, the following conditional expression is satisfied.

$$3.0<|fg1/fw|<6.1 \qquad (1)$$

The conditional expression (1) appropriately sets the focal length of the meniscus-shaped negative lens g1. By satisfying the conditional expression (1), the retrofocus type power arrangement is easily carried out in the entire system (at the wide angle end when the optical system is the zoom lens). In such a manner, the wide field angle (at the wide angle end when the optical system is the zoom lens) of the optical system, and the reduction of the effective diameter of the front lens element are realized. When |fg1/fw| exceeds an upper limit of the conditional expression (1), the negative refractive power of the negative lens g1 becomes too weak. Thus, it becomes difficult to achieve the retrofocus type power arrangement, and it also becomes difficult to realize the wide field angle. In addition, it also becomes difficult to reduce the effective diameter of the front lens element.

On the other hand, when |fg1/fw| falls below a lower limit of the conditional expression (1), the negative refractive power of the negative lens g1 becomes too strong, and hence it becomes difficult to correct the distortion aberration and the chromatic aberration of magnification. In addition, the following conditional expression is satisfied:

$$1.9<R2/fw<3.0 \qquad (2)$$

where R2 denotes a curvature radius of the lens surface on the image side of the meniscus-shaped negative lens g1.

The conditional expression (2) appropriately sets the curvature radius of the lens surface on the image side of the negative lens g1. Note that, in each of Examples 1 to 3, the optical system includes a meniscus-shaped negative lens g2 on the image side of the negative lens g1. As described for the conditional expression (1), in the optical system of each of Examples 1 to 3, the refractive power of the meniscus-shaped negative lens g1 is strengthened, and hence the retrofocus type power arrangement is achieved, to thereby attain the wide field angle (the increased field angle at the wide angle end when the optical system is the zoom lens).

However, when the field angle becomes the wide field angle, for example, becomes the ultra-wide field angle in which the field angle exceeds 1200, the curvature radius of the lens surface on the image side of the negative lens g1 becomes too small. Hence, the light flux reflected by the lens surface on the object side of the negative lens g2 is reflected by the lens surface on the image side of the negative lens g1 to turn into the ghost. In addition, it becomes difficult to avoid the ghost.

The curvature radius of the lens surface on the image side of the negative lens g1 is increased so as to satisfy the conditional expression (2). In such a manner, the ghost by the harmful reflected light generated on the lens surface on the image side of the negative lens g1 is greatly reduced. When R2/fw exceeds an upper limit of the conditional expression (2), and hence the curvature radius of the lens surface on the image side of the negative lens g1 becomes too large, it becomes difficult to strengthen the negative refractive power of the negative lens g1, and it also becomes difficult to realize the wide field angle. In addition, it is also difficult to reduce the effective diameter of the front lens element. On the other hand, when R2/fw falls below a lower limit of the conditional expression (2), and hence the curvature radius of the lens surface on the image side of the negative lens g1 becomes too small, it becomes difficult to correct the distortion aberration.

It is more preferred to set the numerical value ranges of the conditional expression (1) and the conditional expression (2) as follows.

$$4.0<|fg1/fw|<5.8 \qquad (1a)$$

$$2.00<R2/fw<2.95 \qquad (2a)$$

As described above, according to each of Examples 1 to 3, the optical system is readily obtained in which in spite of the wide field angle, the satisfactory optical characteristic is maintained and the ghost and the flare are more reduced.

Note that, when the optical system is constructed of the zoom lens, it is preferred to set the zoom ratio to be 3 or less. When the zoom ratio becomes too large, the aberration variation following the zooming becomes large, and hence it becomes difficult to satisfactory correct the aberrations in the entire zoon range. In addition, this state is not preferred because the effective diameter of the front lens element is increased. It is more preferred to set the zoom ratio of the optical system to be 2.5 or less, and it is much more preferred to set the zoom ratio of the optical system to be 2.3 or less.

It is much more preferred to satisfy at least one of the following conditional expressions in the optical system of each of Examples 1 to 3. According to this, the effects corresponding to the conditional expressions are obtained. The total lens length (the total lens length at the wide angle end when the optical system is the zoom lens) is denoted by Lw. Here, the total lens length means a distance from the first lens surface on the object side to the image plane. The front unit LF includes a meniscus-shaped negative lens g2 on the image side of the negative lens g1, and a focal length of the negative lens g2 is denoted by fg2. The curvature radius of the lens surface on the object side of the negative lens g2 is denoted by R3. A focal length of an air lens which is formed by the lens surface on the image side of the negative lens g1 and the lens surface on the object side of the negative lens g2 is denoted by fg12.

In this case, it is preferred to satisfy at least one of the following conditional expressions.

$$8.0 < Lw/fw < 20.0 \quad (3)$$

$$3.0 < |fg2/fw| < 10.0 \quad (4)$$

$$1.5 < R3/fw < 4.5 \quad (5)$$

$$10.0 < |fg12|/fw < 40.0 \quad (6)$$

Next, the technical meanings of the above conditional expressions (3) to (6) are described.

The conditional expression (3) relates to a ratio of the total lens length to the focal length (the focal length at the wide angle end when the optical system is the zoom lens) of the optical system. The conditional expression (3) appropriately sets the so-called telephoto ratio. When Lw/fw exceeds an upper limit of the conditional expression (3), and hence the total lens length becomes too long, it becomes difficult to reduce the effective diameter of the front lens element. On the other hand, when Lw/fw falls below a lower limit of the conditional expression (3), and hence the total lens length becomes too short, a Petzval sum becomes too large in a positive direction. As a result, the field curvature increases, and hence it becomes difficult to correct the increase in field curvature.

The conditional expression (4) appropriately sets the focal length of the meniscus-shaped negative lens g2 on the image side of the negative lens g1. By satisfying the conditional expression (4), the retrofocus type power arrangement (the power arrangement at the wide angle end when the optical system is the zoom lens) can be achieved, and hence the wide field angle and the reduction of the effective diameter of the front lens element are easily realized.

When |fg2/fw| exceeds an upper limit of the conditional expression (4), the negative refractive power of the meniscus-shaped negative lens g2 becomes too weak. Thus, it becomes difficult to achieve the retrofocus type power arrangement, and it also becomes difficult to realize the wide field angle. In addition, it also becomes difficult to reduce the effective diameter of the front lens element. On the other hand, when |fg2/fw| falls below a lower limit of the conditional expression (4), the negative refractive power of the meniscus-shaped negative lens g2 becomes too strong, and hence the distortion aberration and the chromatic aberration of magnification are difficult to correct at the wide angle end.

The conditional expression (5) appropriately sets the curvature radius of the lens surface on the object side of the meniscus-shaped negative lens g2 on the image side of the negative lens g1. By satisfying the conditional expression (5) to increase the curvature radius of the lens surface on the object side of the negative lens g2, the ghost is reduced which is generated by reflecting the light flux by the lens surface on the object side of the negative lens g2 and the lens surface on the object side or the image side of the negative lens g1.

When R3/fw exceeds an upper limit of the conditional expression (5), and hence the curvature radius of the lens surface on the object side of the negative lens g2 becomes too large, the distortion aberration is increased, and hence becomes difficult to correct. On the other hand, when R3/fw falls below a lower limit of the conditional expression (5), and hence the curvature radius of the lens surface on the object side of the negative lens g2 becomes too small, it becomes difficult to strengthen the negative refractive power of the negative lens g2, and hence it also becomes difficult to realize the wide field angle. In addition, it becomes difficult to reduce the ghost which is generated by reflecting the light flux by the lens surface on the object side of the negative lens g2 and the lens surface on the object side or the image side of the negative lens g1.

The conditional expression (6) appropriately sets a focal length of an air lens formed between the meniscus-shaped negative lens g1 and the meniscus-shaped negative lens g2. When |fg12|/fw exceeds an upper limit of the conditional expression (6), and hence the negative focal length of the air lens becomes long (an absolute value of the focal length becomes large), that is, a curvature radius of the lens surface on the object side of the meniscus-shaped negative lens g2 becomes too small, it becomes difficult to strengthen the negative refractive power of the meniscus-shaped negative lens g2. In addition, it also becomes difficult to realize the wide field angle. In addition, it becomes difficult to reduce the ghost which is generated by reflecting the light flux by the lens surface on the object side of the negative lens g2 and the lens surface on the object side or the image side of the negative lens g1.

On the other hand, when |fg12|/fw falls below a lower limit of the conditional expression (6), and hence the negative focal length of the air lens becomes short (the absolute value of the focal length becomes small), that is, the curvature radius of the lens surface on the object side of the negative lens g2 becomes too large, the distortion aberration increases, and becomes difficult to correct. It is more preferred to set the numerical value ranges of the conditional expression (3) to the conditional expression (6) as follows.

$$10.0 < Lw/fw < 17.0 \quad (3a)$$

$$3.5 < |fg2/fw| < 9.5 \quad (4a)$$

$$2.0 < R3/fw < 4.0 \quad (5a)$$

$$12.0 < |fg12|/fw < 30.0 \quad (6a)$$

It is preferred to adopt the following structure in each of Examples 1 to 3.

It is preferred that the lens surface on the object side of the meniscus-shaped negative lens g1 be formed to have an aspherical shape. By forming the lens surface on the object side of the meniscus-shaped negative lens g1 to have the aspherical shape, the reduction of the effective diameter of the front lens element, and the correction of the distortion aberration are easily realized. It is preferred that, in the front unit LF, three negative lenses be continuously arranged in order from the object side to the image side. According to this structure, the retrofocus type power arrangement is easily achieved, and the wide field angle, and the reduction of the effective diameter of the front lens element are easily realized. It is preferred that the lens surface on the image side of the negative lens g2 be formed to have an aspherical shape. According to this structure, the reduction of the effective diameter of the front lens element, and the correction of the distortion aberration are easily realized.

By adopting the structure described above, it is possible to obtain the optical system capable of, in spite of the ultra-wide field angle having the photographing field angle exceeding 120°, maintaining the satisfactory optical characteristic and reducing the ghost and the flare, and the image pickup apparatus including the same.

Next, a single-lens reflex camera system (image pickup apparatus) according to one embodiment of the present invention, which includes the optical system of the present invention, is described with reference to FIG. 7. In FIG. 7, the single-lens reflex camera system includes a single-lens reflex camera main body 10. An interchangeable lens 11 includes the optical system according to the present invention. A recording unit 12 corresponding to a film or an image pickup element is provided to record (receive) a subject image obtained through the interchangeable lens 11. A finder optical system 13 is provided to observe the subject image from the interchangeable lens 11. A quick return mirror 14 is turned to transmit the subject image formed in the interchangeable lens 11 to one of the recording unit 12 and the finder optical system 13.

When the subject image is to be observed using a finder, the subject image formed on a focusing plate 15 through the quick return mirror 14 is converted into an erect image by a penta prism 16, and then enlarged for observation using an eyepiece optical system 17. In photographing, the quick return mirror 14 is turned in a direction indicated by the arrow, and the subject image is formed on and recorded in the recording unit 12. The single-lens reflex camera system further includes a sub-mirror 18 and a focus point detector 19.

By applying the optical system of the present invention to the image pickup apparatus such as the single-lens reflex camera including the interchangeable lens or the like, the image pickup apparatus having the high optical characteristic can be realized. Note that, the optical system of the present invention can be similarly applied to a camera without a quick return mirror. In addition, the optical system of the present invention can be similarly applied to a projection lens for a projector.

Next, numerical examples corresponding to the respective examples of the present invention are described. In each numerical example, surface number i denotes an order from the object side, symbol ri denotes a curvature radius of the lens surface, symbol di denotes a lens thickness and an air distance between the i-th surface and the (i+1)th surface, and symbols ndi and vdi respectively denote a refractive index and Abbe constant with respect to the d-line. Symbol BF denotes back focus, which corresponds to a distance from the last lens surface to an image plane. The total lens length is a distance from the first lens surface to the image plane. An aspherical shape is expressed by the following equation:

$$X = \frac{(1/R)H^2}{1 + \sqrt{1 - (1+K)(H/R)^2}} + A4 \times H^4 + A6 \times H^6 + A8 \times H^8 + A10 \times H^{10} + A12 \times H^{12} + A14 \times H^{14}$$

where the X axis corresponds to the optical axis direction, the H axis corresponds to the direction perpendicular to the optical axis, the light propagation direction is positive, symbol R denotes a paraxial curvature radius, symbol K denotes a conic constant, and symbols A4, A6, A8, A10, A12, and A14 each denote an aspherical coefficient.

In addition, [e+X] means [×10+$^x$], and [e−X] means [×10$^{-x}$]. The aspherical surface is indicated by adding * as a suffix to surface number. In addition, the part where an interval d between optical surfaces is (variable) is changed for zooming. In addition, correspondence between each numerical example and the above-mentioned conditional expression is shown in Table 1.

Numerical Example 1

Unit mm

Surface data

| Surface number | r | d | nd | vd | Effective diameter |
|---|---|---|---|---|---|
| 1* | 100.402 | 3.10 | 1.77250 | 49.6 | 83.99 |
| 2 | 32.787 | 10.70 | | | 62.10 |
| 3 | 42.207 | 3.20 | 1.58443 | 59.4 | 59.67 |
| 4* | 20.133 | 10.96 | | | 49.61 |
| 5 | 100.037 | 2.60 | 1.85000 | 40.3 | 46.09 |
| 6* | 47.753 | 5.77 | | | 36.38 |
| 7 | 313.541 | 1.30 | 1.59522 | 67.7 | 35.84 |
| 8 | 24.146 | 7.54 | | | 30.95 |
| 9 | −76.811 | 1.15 | 1.43875 | 94.9 | 30.84 |
| 10 | 64.103 | 0.89 | | | 30.46 |
| 11 | 39.327 | 6.40 | 1.72047 | 34.7 | 30.67 |
| 12 | −123.615 | (Variable) | | | 29.97 |
| 13 | ∞ | (Variable) | | | 17.72 |
| | | | | | (Flare cut stop) |
| 14 (Stop) | ∞ | (Variable) | | | 18.91 |
| 15 | 20.914 | 1.10 | 2.00100 | 29.1 | 20.11 |
| 16 | 15.600 | 7.47 | 1.57501 | 41.5 | 19.38 |
| 17 | −34.531 | 2.04 | | | 19.13 |
| 18 | −26.292 | 0.90 | 1.91082 | 35.3 | 18.24 |
| 19 | 68.346 | 2.28 | 1.80518 | 25.4 | 18.57 |
| 20 | −87.663 | (Variable) | | | 18.72 |
| 21 | ∞ | 0.00 | | | 18.98 |
| | | | | | (Flare cut stop) |
| 22 | 29.727 | 0.95 | 1.88300 | 40.8 | 19.07 |
| 23 | 14.164 | 6.33 | 1.51742 | 52.4 | 18.30 |
| 24 | −97.092 | 0.95 | 1.83481 | 42.7 | 18.40 |
| 25 | 117.819 | 0.15 | | | 18.52 |
| 26 | 22.677 | 6.42 | 1.49700 | 81.5 | 19.06 |
| 27 | −27.253 | 0.20 | | | 19.64 |
| 28 | −210.616 | 1.10 | 1.88300 | 40.8 | 19.59 |
| 29 | 16.507 | 7.00 | 1.58313 | 59.4 | 19.72 |
| 30* | −89.025 | (Variable) | | | 20.89 |
| Image plane | ∞ | | | | |

Aspherical surface data

First surface

K = 0.00000e+000   A4 = 5.07039e−006   A6 = −3.66524e−009
A8 = 2.14684e−012   A10 = −1.59746e−016   A12 = −3.49877e−019
A14 = 1.41029e−022

Fourth surface

K = −3.08703e+000   A4 = 3.79875e−005   A6 = −6.27286e−008
A8 = 1.29970e−011   A10 = 1.49707e−014

Sixth surface

K = 0.00000e+000   A4 = 1.15171e−005   A6 = −2.29358e−009
A8 = 2.08815e−010   A10 = −7.57344e−013   A12 = 1.20672e−015

Thirtieth surface

K = 0.00000e+000   A4 = 1.96961e−005   A6 = 3.33943e−008
A8 = 2.90343e−011   A10 = −2.00200e−013   A12 = 7.23046e−015

Various data
Zoom ratio 2.05

| | Wide angle | Intermediate | Telephoto |
|---|---|---|---|
| Focal length | 11.33 | 17.32 | 23.28 |
| F number | 4.12 | 4.12 | 4.12 |
| Half field angle (degree) | 62.36 | 51.32 | 42.90 |
| Image height | 21.64 | 21.64 | 21.64 |
| Total lens length | 171.38 | 162.77 | 165.23 |
| BF | 39.88 | 52.64 | 65.40 |
| d12 | 26.47 | 7.95 | 0.51 |

-continued

Unit mm

| | | | |
|---|---|---|---|
| d13 | 9.51 | 6.65 | 3.80 |
| d14 | 1.74 | 1.51 | 1.29 |
| d20 | 3.29 | 3.52 | 3.74 |
| d30 | 39.88 | 52.64 | 65.40 |

Zoom lens unit data

| Unit | First surface | Focal length |
|---|---|---|
| 1 | 1 | −18.23 |
| 2 | 13 | ∞ |
| 3 | 14 | ∞ |
| 4 | 15 | 70.93 |
| 5 | 21 | 56.82 |

Numerical Example 2

Unit mm

Surface data

| Surface number | r | d | nd | vd | Effective diameter |
|---|---|---|---|---|---|
| 1* | 66.540 | 2.60 | 1.77250 | 49.6 | 69.99 |
| 2 | 25.367 | 8.07 | | | 49.58 |
| 3 | 28.749 | 2.60 | 1.58383 | 59.4 | 47.72 |
| 4* | 16.316 | 10.33 | | | 43.43 |
| 5 | 100.001 | 2.10 | 1.85400 | 40.4 | 40.57 |
| 6* | 32.421 | 6.16 | | | 30.66 |
| 7 | 189.979 | 1.30 | 1.59522 | 67.7 | 30.34 |
| 8 | 39.134 | 5.01 | | | 28.64 |
| 9 | −53.880 | 1.20 | 1.43875 | 94.9 | 28.51 |
| 10 | 56.561 | 0.15 | | | 28.22 |
| 11 | 36.018 | 7.45 | 1.72047 | 34.7 | 28.40 |
| 12 | −99.582 | (Variable) | | | 27.43 |
| 13 | ∞ | (Variable) | | | 16.59 (Flare cut stop) |
| 14 (Stop) | ∞ | 1.74 | | | 17.77 |
| 15 | 20.662 | 1.00 | 2.00100 | 29.1 | 19.04 |
| 16 | 15.022 | 7.90 | 1.61340 | 44.3 | 18.38 |
| 17 | −32.080 | 1.45 | | | 18.05 |
| 18 | −26.143 | 0.90 | 1.91082 | 35.3 | 17.34 |
| 19 | 26.601 | 3.61 | 1.85478 | 24.8 | 17.60 |
| 20 | −105.795 | 3.69 | | | 17.76 |
| 21 | ∞ | 0.00 | | | 17.86 (Flare cut stop) |
| 22 | 29.922 | 0.95 | 1.88300 | 40.8 | 17.89 |
| 23 | 14.726 | 6.00 | 1.49700 | 81.5 | 17.23 |
| 24 | −106.579 | 0.14 | | | 17.26 |
| 25 | −86.482 | 0.95 | 1.76421 | 50.4 | 17.26 |
| 26 | 81.303 | 0.15 | | | 17.35 |
| 27 | 21.584 | 6.24 | 1.49700 | 81.5 | 19.33 |
| 28 | −28.319 | 0.20 | | | 19.84 |
| 29 | −261.504 | 1.05 | 1.88300 | 40.8 | 19.82 |
| 30 | 19.182 | 5.48 | 1.58313 | 59.4 | 19.94 |
| 31* | −103.197 | (Variable) | | | 20.67 |
| Image plane | ∞ | | | | |

Aspherical surface data

First surface

K = 0.00000e+000  A4 = 6.42646e−006  A6 = −8.86916e−009
A8 = 1.26766e−011  A10 = −9.48216e−015  A12 = 3.74162e−018
A14 = −2.77582e−022

Fourth surface

K = −1.00193e+000  A4 = 9.47246e−006  A6 = −3.04033e−008
A8 = −9.25956e−011  A10 = 1.29892e−013

Sixth surface

K = 0.00000e+000  A4 = 2.20599e−005  A6 = 2.45095e−008
A8 = 5.49604e−010  A10 = −3.00594e−012  A12 = 8.33695e−015

Thirty-first surface

K = 0.00000e+000  A4 = 2.69196e−005  A6 = 2.94334e−008
A8 = 8.62945e−010  A10 = −6.99775e−012  A12 = 3.65541e−014

Various data
Zoom ratio 1.88

| | Wide angle | Intermediate | Telephoto |
|---|---|---|---|
| Focal length | 12.36 | 17.82 | 23.28 |
| F number | 4.12 | 4.12 | 4.12 |
| Half field angle (degree) | 60.26 | 50.52 | 42.90 |
| Image height | 21.64 | 21.64 | 21.64 |
| Total lens length | 158.46 | 152.79 | 155.01 |
| BF | 40.01 | 51.17 | 62.34 |
| d12 | 20.62 | 6.58 | 0.44 |
| d13 | 9.40 | 6.60 | 3.80 |
| d31 | 40.01 | 51.17 | 62.34 |

Zoom lens unit data

| Unit | First surface | Focal length |
|---|---|---|
| 1 | 1 | −18.23 |
| 2 | 13 | ∞ |
| 3 | 14 | 37.27 |

Numerical Example 3

Unit mm

Surface data

| Surface number | r | d | nd | vd | Effective diameter |
|---|---|---|---|---|---|
| 1* | 63.441 | 2.20 | 1.69680 | 55.5 | 59.00 |
| 2 | 25.442 | 5.52 | | | 45.91 |
| 3 | 28.300 | 2.20 | 1.58313 | 59.4 | 42.76 |
| 4* | 12.904 | 7.23 | | | 37.90 |
| 5 | 50.374 | 1.70 | 1.85000 | 40.3 | 31.20 |
| 6* | 24.947 | 4.05 | | | 22.99 |
| 7 | 59.522 | 0.85 | 1.59522 | 67.7 | 22.32 |
| 8 | 15.341 | 4.35 | | | 19.00 |
| 9 | −64.807 | 0.80 | 1.43875 | 94.9 | 18.69 |
| 10 | 31.693 | 0.20 | | | 17.51 |
| 11 | 20.918 | 10.35 | 1.72047 | 34.7 | 17.21 |
| 12 | 547.908 | 1.48 | | | 12.19 |
| 13 | ∞ | 7.86 | | | 10.62 (Flare cut stop) |
| 14 (Stop) | ∞ | 0.00 | | | 13.07 |
| 15 | 22.443 | 1.42 | 2.00100 | 29.1 | 13.39 |
| 16 | 14.385 | 4.86 | 1.62004 | 36.3 | 13.07 |
| 17 | −20.142 | 0.17 | | | 13.16 |
| 18 | −20.527 | 0.80 | 1.91082 | 35.3 | 13.08 |
| 19 | 20.122 | 3.34 | 1.84666 | 23.8 | 13.46 |
| 20 | −235.657 | 2.62 | | | 13.79 |
| 21 | 20.587 | 0.80 | 1.88300 | 40.8 | 14.78 |
| 22 | 12.875 | 6.84 | 1.51742 | 52.4 | 14.40 |
| 23 | −13.416 | 0.80 | 1.83400 | 37.2 | 15.20 |
| 24 | 160.886 | 0.15 | | | 17.31 |
| 25 | 40.147 | 6.23 | 1.49700 | 81.5 | 19.53 |
| 26 | −19.300 | 0.20 | | | 20.70 |

-continued

Unit mm

| | | | | | |
|---|---|---|---|---|---|
| 27 | 54.325 | 1.10 | 1.88300 | 40.8 | 21.87 |
| 28 | 15.275 | 8.45 | 1.55332 | 71.7 | 21.64 |
| 29* | −48.549 | | | | 22.86 |
| Image plane | ∞ | | | | |

Aspherical surface data

First surface

K = 0.00000e+000   A4 = 5.33233e−006   A6 = 1.54429e−009
A8 = −8.67461e−013   A10 = 2.56875e−015   A12 = −1.67470e−018
A14 = 2.74451e−021

Fourth surface

K = −1.68145e+000   A4 = −7.54012e−007   A6 = −6.22445e−008
A8 = 6.75757e−011   A10 = 2.02117e−014

Sixth surface

K = 0.00000e+000   A4 = 7.63671e−005   A6 = 1.39072e−007
A8 = 4.35972e−010   A10 = −9.56156e−012   A12 = 8.97876e−014

Twenty-ninth surface

K = 0.00000e+000   A4 = 2.00655e−005   A6 = −5.66525e−009
A8 = 3.94520e−010   A10 = −2.36003e−012   A12 = 5.91161e−015

Various data

| | |
|---|---|
| Focal length | 10.30 |
| F number | 2.88 |
| Half field angle (degree) | 64.54 |
| Image height | 21.64 |
| Total lens length | 124.58 |
| BF | 38.00 |

TABLE 1

| | Conditional Expression | Example 1 | Example 2 | Example 3 |
|---|---|---|---|---|
| (1) | fg1/fw | 5.68 | 4.42 | 5.17 |
| (2) | R2/fw | 2.89 | 2.05 | 2.84 |
| (3) | Lw/fw | 15.12 | 12.82 | 12.17 |
| (4) | fg2/fw | 6.14 | 4.17 | 9.21 |
| (5) | R3/fw | 3.73 | 2.75 | 3.28 |
| (6) | |fg12|/fw | 14.18 | 15.70 | 15.10 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-241734, filed Nov. 22, 2013 which is hereby incorporated by reference herein in its entirety.

What is claimed is:

1. An optical system, comprising, in order from an object side to an image side:
a front unit (LF) having a negative refractive power;
an aperture stop; and
a rear unit (LR) having a positive refractive power,
wherein the front unit (LF) comprises a meniscus-shaped negative lens (g1) closest to the object side,
wherein the following conditional expressions are satisfied:

$$3.0<|fg1/fw|<6.1$$

$$1.9<R2/fw<3.0$$

where fw denotes a focal length of the entire optical system, fg1 denotes a focal length of the meniscus-shaped negative lens (g1), and R2 denotes a curvature radius of a lens surface on the image side of the meniscus-shaped negative lens (g1),
wherein the front unit (LF) comprises three negative lenses continuously arranged in order from the object side to the image side, and
wherein each of the three negative lenses included in the front unit is a meniscus-shaped lens having a convex surface facing the object side.

2. An optical system according to claim 1, wherein the following conditional expression is satisfied:

$$8.0<Lw/fw<20.0$$

where Lw denotes a total lens length.

3. An optical system according to claim 1, wherein the front unit (LF) comprises a meniscus-shaped negative lens (g2) on the image side of the meniscus-shaped negative lens (g1), and
wherein the following conditional expression is satisfied:

$$3.0<|fg2/fw|<10.0$$

where fg2 denotes a focal length of the meniscus-shaped negative lens (g2).

4. An optical system according to claim 3, wherein the following conditional expression is satisfied:

$$1.5<R3/fw<4.5$$

where R3 denotes a curvature radius of a lens surface on the object side of the meniscus-shaped negative lens (g2).

5. An optical system according to claim 3, wherein the following conditional expression is satisfied:

$$10.0<|fg12|/fw<40.0$$

where fg12 denotes a focal length of an air lens formed by a lens surface on the image side of the meniscus-shaped negative lens (g1), and a lens surface on the object side of the meniscus-shaped negative lens (g2).

6. An optical system according to claim 1,
wherein the optical system comprises a zoom lens,
wherein the front unit consists of a first lens unit having a negative refractive power,
wherein the rear unit consists of, in order from the object side to the image side, a second lens unit having a positive refractive power, and a third lens unit having a positive refractive power, and
wherein, during zooming, an interval between adjacent two of the first lens unit, the second lens unit, and the third lens unit changes.

7. An optical system according to claim 6, wherein, during the zooming from a wide angle end to a telephoto end, the first lens unit moves to the image side so as to draw a concave-shaped locus, and each of the second lens unit and the third lens unit moves to the object side.

8. An optical system according to claim 1,
wherein the optical system comprises a zoom lens,
wherein the front unit consists of a first lens unit having a negative refractive power,
wherein the rear unit consists of a second lens unit having a positive refractive power, and
wherein, during zooming, the first lens unit and the second lens unit move so as to draw different loci.

9. An optical system according to claim 8, wherein, during the zooming from a wide angle end to a telephoto end, the first lens unit moves to the image side so as to draw a convex-shaped locus, and the second lens unit moves to the object side.

10. An optical system according to claim 1,
wherein the optical system comprises a fixed focal length lens, and
wherein, during focusing, at least a part of the rear unit moves.

11. An optical system according to claim 1, wherein the optical system is configured to form an image on an image sensor.

12. An image pickup apparatus, comprising:
an optical system; and
an image sensor configured to receive an image formed by the optical system,
wherein the optical system comprises, in order from an object side to an image side:
a front unit (LF) having a negative refractive power;
an aperture stop; and
a rear unit (LR) having a positive refractive power,
wherein the front unit (LF) comprises a meniscus-shaped negative lens (g1) closest to the object side,
wherein the following conditional expressions are satisfied:

$$3.0 < |fg1/fw| < 6.1$$

$$1.9 < R2/fw < 3.0$$

where fw denotes a focal length of the entire optical system, fg1 denotes a focal length of
the meniscus-shaped negative lens (g1), and R2 denotes a curvature radius of a lens
surface on the image side of the meniscus-shaped negative lens (g1),
wherein the front unit (LF) comprises three negative lenses continuously arranged in order from the object side to the image side, and
wherein each of the three negative lenses included in the front unit is a meniscus-shaped lens having a convex surface facing the object side.

* * * * *